(No Model.)   3 Sheets—Sheet 1.

T. S. C. LOWE.
APPARATUS FOR THE MANUFACTURE OF WATER GAS.

No. 445,450.   Patented Jan. 27, 1891.

Witnesses:
Robert Pruitt,
Geo. W. Rea.

Inventor:
Thaddeus S. C. Lowe,
By James L. Norris,
Atty.

(No Model.) 3 Sheets—Sheet 2.

T. S. C. LOWE.
APPARATUS FOR THE MANUFACTURE OF WATER GAS.

No. 445,450. Patented Jan. 27, 1891.

Witnesses.
Robert Everett
Geo. W. Rea

Inventor:
Thaddeus S. C. Lowe.
By James L. Norris
Atty.

(No Model.)　　　　　　　　　　　　　　　3 Sheets—Sheet 3.
T. S. C. LOWE.
APPARATUS FOR THE MANUFACTURE OF WATER GAS.

No. 445,450.　　　　　　　　　Patented Jan. 27, 1891.

Witnesses.
Robert Ewiatt,
Geo. W. Rea.

Inventor.
Thaddeus S. C. Lowe.
By
James L. Norris.
Atty.

UNITED STATES PATENT OFFICE.

THADDEUS S. C. LOWE, OF NORRISTOWN, ASSIGNOR TO THE GUARANTEE TRUST AND SAFE DEPOSIT COMPANY, TRUSTEE, OF PHILADELPHIA, PENNSYLVANIA.

APPARATUS FOR THE MANUFACTURE OF WATER-GAS.

SPECIFICATION forming part of Letters Patent No. 445,450, dated January 27, 1891.

Application filed November 28, 1888. Serial No. 292,113½. (No model.)

*To all whom it may concern:*

Be it known that I, THADDEUS S. C. LOWE, a citizen of the United States, residing at Norristown, in the county of Montgomery and State of Pennsylvania, have invented new and useful Improvements in Apparatus for the Manufacture of Water-Gas, of which the following is a specification.

This invention relates to improvements in apparatus employed in the manufacture of non-illuminating water-gas; and it consists chiefly in certain combinations of devices with the gas-generator, as hereinafter specified, whereby the time and quantity of fuel required for keeping the apparatus heated to a degree most desirable for the decomposition of water are materially lessened.

Figure 1:
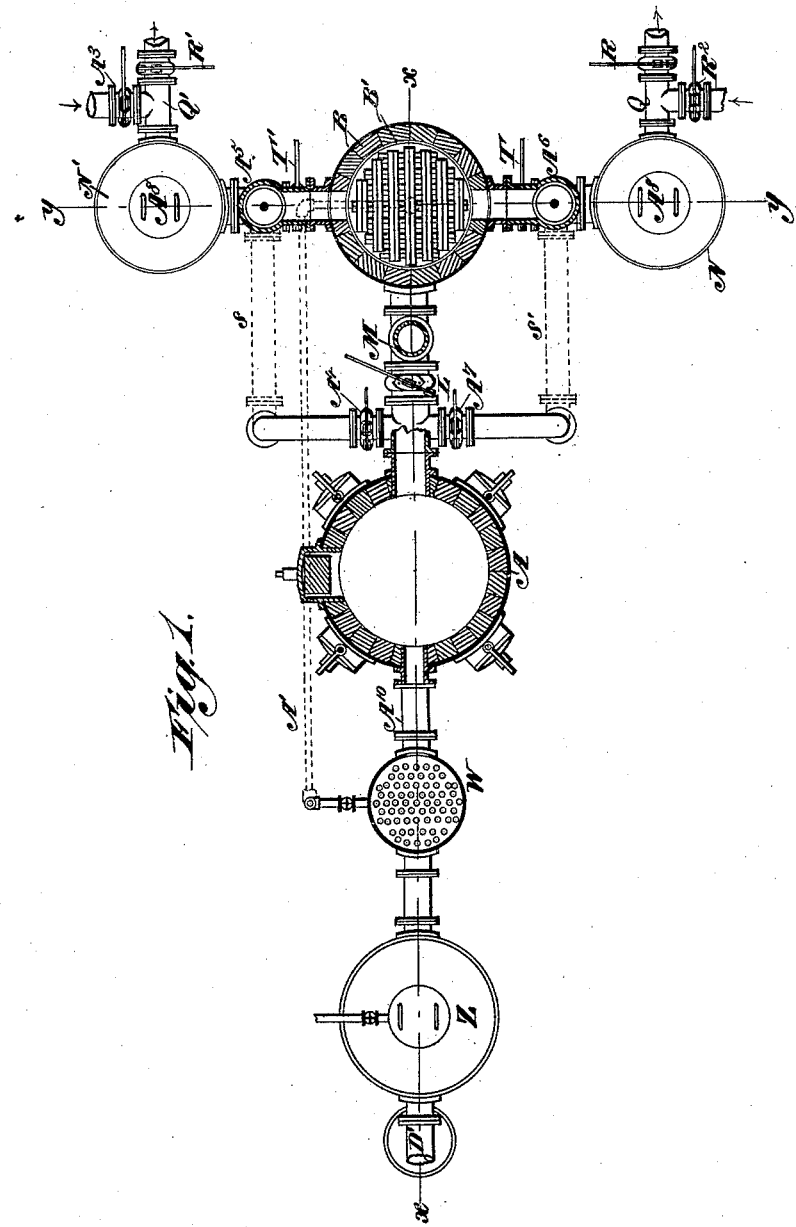
Figure 2:
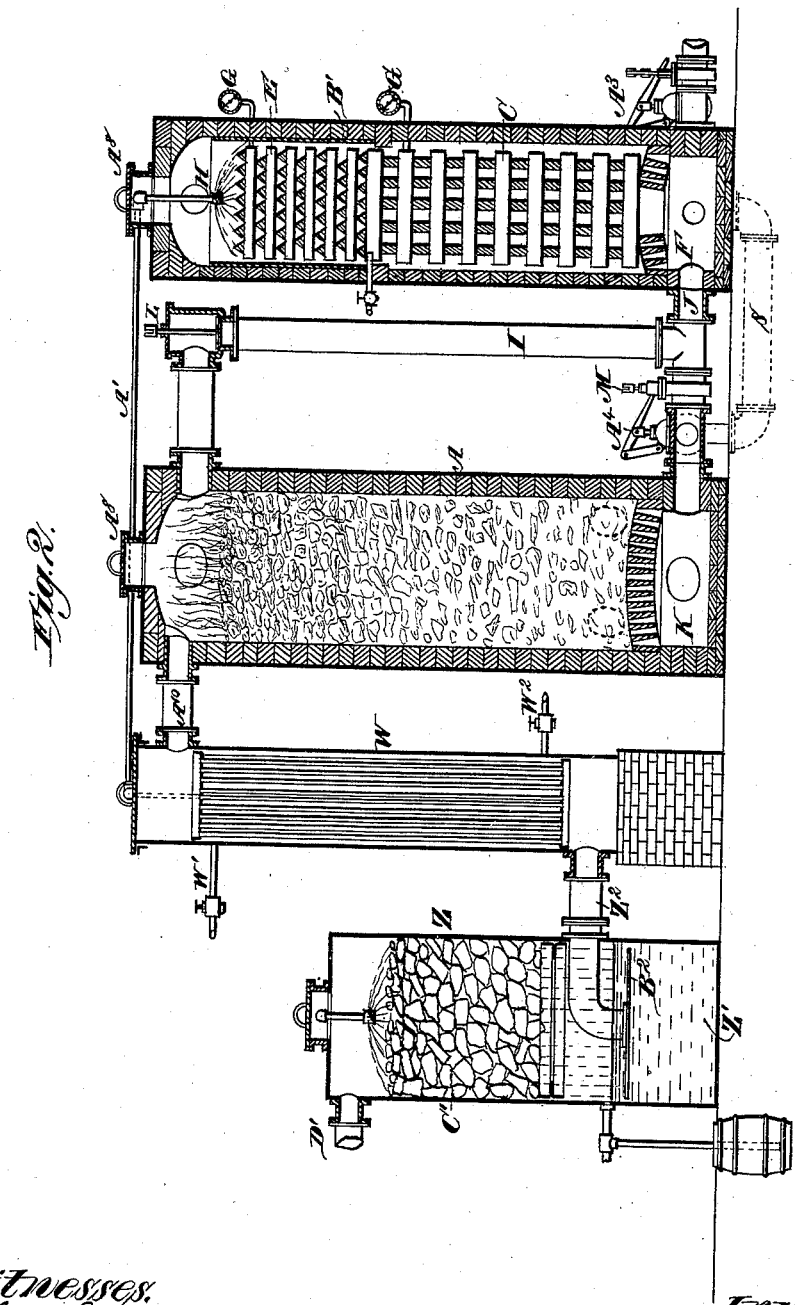
Figure 3:
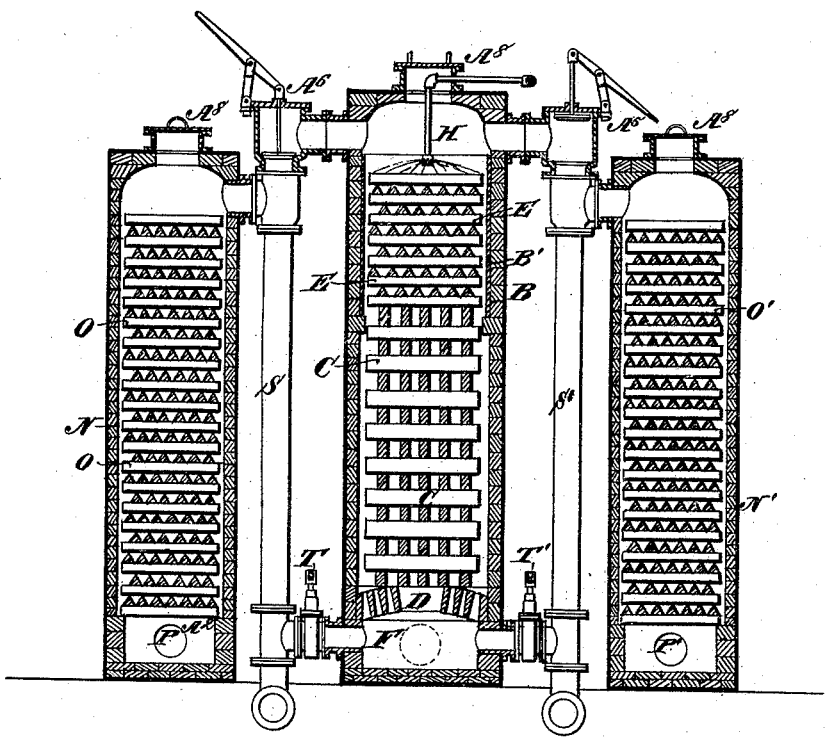

In the annexed drawings, Figure 1 is a plan of a complete gas-making apparatus embodying my improvements, and Figs. 2 and 3 are sectional elevations of the same, the former on the line $x\ x$ and the latter on the line $y\ y$ of Fig. 1.

A designates the gas-generator.

B is a combined steam generator and superheater, consisting of an iron shell lined with refractory materials, preferably fire-bricks.

C represents open brick-work, preferably composed of fire-bricks resting on a perforated arch D of fire-bricks, and E represents an open-work structure of metal bars, preferably of cast iron or steel, resting on the fire-brick open-work structure C within the steam generator and superheater B, as shown in Figs. 2 and 3. In the superheater B is an interior iron sheathing B' to protect the fire-brick lining of said superheater against injury from water and wet steam.

F is a gas-combustion chamber in the base of the steam generator and superheater B, and G, Fig. 2, represents pyrometers.

H is a nozzle for spraying water over the metal bars E in the steam generator and superheater.

I is a flue for conveying gas from the gas-generator A to the combustion-chamber F in the base of the steam-generator.

J is a flue leading from the chamber F to the ash-pit K of the gas-generator.

L and M are valves for said flues I and J.

N N' are hot-blast stoves, each consisting of an upright iron shell lined with refractory material, preferably fire-bricks, and inclosing open-work structures of metal bars O O', Fig. 3, preferably of cast iron or steel.

P P', Fig. 3, are openings in the stoves N N', leading into pipes Q Q', Fig. 1, which lead into a chimney. These pipes Q Q' have valves R R', as shown.

S S' are flues for conveying hot blasts of atmospheric air from the stoves N N' partly into the gas-combustion chamber F at the base of the steam-generator and partly into the ash-pit K of the gas-generator.

T T', Figs. 1 and 3, are valves for alternating the passage of the hot-blast currents through said flues S S', and $A^4\ A^7$, Fig. 1, are valves for alternating the passage of hot air from the stoves N N', respectively, into the gas-generator A to support combustion of the fuel in said generator.

The flues I and J may be lined with clay pipes or other material suitable for resisting the action of the heated steam on the iron and for preventing the loss of heat; and the valves in those flues and their connections are preferably made of or coated with soap-stone, fire-clay, or other highly refractory materials, the object being to protect them against attack from the oxygen of the superheated steam.

The flues S S' may be lined or externally coated with asbestus, fire-clay, or other suitable material to prevent loss of heat.

W, Figs. 1 and 2, is an upright tubular boiler.

A' is a pipe for conveying hot water from the boiler W to the spraying device H in the upper part of the steam generator and superheater B, as shown in Fig. 2.

The gas-generator A, steam generator and superheater B, and stoves N N' are each provided at the top with a lid-covered aperture $A^8$, as shown in Figs. 2 and 3.

Z is a combined washer and scrubber having in its lower part a water seal Z', Fig. 2, for the inner end of a pipe $Z^2$, through which the gas to be washed and scrubbed is conveyed to the under side of a diaphragm $B^2$, which is supported in said pipe beneath the surface of the water-seal. Above the water seal Z' is supported a quantity of broken bricks or other suitable material C', kept wet by a water-spray or otherwise, for the purpose of breaking up the gas-currents and separating impurities therefrom. A pipe D' leading from the upper part of this scrubber conducts the cleansed gas to any desired point for consumption, storage, or further purification, as may be required.

The object of employing the two stoves N N' (which contain material for absorbing the heat carried from the gas-generator by the producer-gas and escaping waste products of combustion formed in the operation of bringing the fuel in the generator up to the proper point for the decomposition of steam and the production of water-gas) is to be enabled to use these stoves alternately for heating the inflowing forced current of atmospheric air on its way to the steam generator and superheater.

When it is desired to put this apparatus into operation, coal or other fuel is placed in the generator A through the aperture $A^8$, or by means of a door on the top or side of the generator, and gradually brought to a state of incandescence by means of a forced blast of air which is admitted through valve $A^3$, Fig. 1, into the chamber $A^2$, Fig. 3, of stove N, up through the metal bars O in this stove, and thence through the flue S, one portion passing through the valve T, Fig. 3, into the base-chamber F of the superheater B, while the other portion of the air-blast passes through valve $A^4$, Figs. 1 and 2, into the ash-pit K of the gas-generator. While this is proceeding the gas produced in the generator A (consisting of carbonic oxide and nitrogen mixed with the air of combustion) passes out through the pipe I, Fig. 2, into the combustion-chamber F of the superheater, where it is ignited and burned in union with the blast of atmospheric air introduced, as above described. When the mass of fuel in the generator A has become highly heated to a considerable depth, and the fire-bricks in the lower part of the superheater B have also become highly heated, the metal bars E in the superheater will have become sufficiently heated for steam-generating purposes. The valve L and the valves R R', Fig. 1, controlling the exit to the chimney, are now closed and the valve M is opened. A cock (not shown) in the pipe A' is then opened and water is sprayed through the nozzle H over the metal bars E in the superheater, which heated metal bars immediately convert the spray into steam, and this steam lower down in the superheater becomes more highly heated, until finally it passes through the flue J into the ash-pit K of the gas-generator, thence up through the mass of fuel in the gas-generator, where it is converted into water-gas, which passes out through the pipe $A^{10}$ into the tubular boiler W, down through the tubes thereof and thence into the hydraulic seal in the lower part of the scrubber Z, and afterward up through the contents of the scrubber and out through the pipe D' to the purifier, holder, or place of consumption. The current of hot water-gas passing from the generator through the tubes of boiler W heats the water in this boiler to a high degree, and sometimes steam is thus formed in the boiler. After a time the metal bars in the upper portion of the superheater will become too cool to generate steam, which fact will be indicated by the pyrometers G, whereupon the water is shut off and the generation of water-gas ceases. This describes the first heat.

Preparatory to a second heat the combustion of the fuel in the generator A is quickened, the producer-gas evolved being conducted, as before described, into the combustion-chamber F of the superheater B and there ignited and burned for the purpose of restoring the required heat to the bricks and metal bars in the superheater. The hot products arising from the combustion of these producer-gases pass up through the superheater out through the valve $A^6$, down through the metal bars O of stove N, out through the aperture P, through flue Q to the chimney, as indicated by the outgoing arrow. At the same time the atmospheric air required to support combustion is being forced in through the alternate stove N' up through the metal bars O' therein, and thence through the flue S' and valve T', one portion into the base-chamber F of the superheater and the other portion through the valve $A^7$ into the ash-pit K of the generator. This is kept up long enough to heat the coal in the generator to incandescence, the bricks and bars in the superheater becoming at the same time sufficiently heated to again generate and superheat steam, any heat still remaining in the escaping products of combustion being absorbed by the metal bars in the stove N. I then close the valves $R^2$, $A^7$, $A^6$, and L, and open valve M. The apparatus is now ready to again make water-gas, proceeding as already described. This completes the second heat.

It will be seen that the stoves N N' are used alternately, and that after the first heat the air of combustion is heated. This has the effect of restoring heat to the superheater more rapidly and with less expense of fuel than would otherwise be the case.

Although I prefer the use of iron bars in the stoves N N', as described, other heat-absorbing refractory metals or materials may be substituted for the bars of iron.

Instead of the two separate stoves for heating the incoming blasts of air, a single shell divided by a partition into two chambers, each containing heat-absorbing materials, may be used.

If desired, an additional boiler, (not shown,) fired in any manner, may be fed through a pipe W, Fig. 2, with the hot water and steam from the boiler W, the latter being supplied through a pipe $W^2$. A safety-valve may be attached to pipe W'. When the additional boiler here referred to is employed, it is to be connected with the superheater by a pipe which terminates with a spraying-nozzle in the top of the superheater when hot water is used, or with an open mouth in the top or side of the superheater when steam is used.

What I claim as my invention is—

1. In an apparatus for making water-gas, the combination, with the gas-generator A and the steam generator and superheater B, of the stoves N N', each provided with an internal open net-work or structure of heat-absorbing materials, flues for connecting said stoves and generators, and regulating-valves by which the outgoing products of combustion from the gas-generator and superheater are caused to pass out through said stoves alternately and the inflowing air-blast for sustaining combustion in the gas-generator is caused to pass through said stoves alternately, substantially as described.

2. In an apparatus for making water-gas, the combination of the gas-generator A, the superheater B, provided with an internal open-work structure of bricks and metal bars, and with conduits for admitting water or steam, or both water and steam, into the superheater, the stoves N N', provided with internal open-work structure of heat-absorbing materials, flues connecting said parts of the apparatus, and valves for controlling said flues, substantially as described.

3. In an apparatus for making water-gas, the combination of the gas-generator A, having ash-pit K and gas-flue $A^{10}$, the tubular boiler W for receiving gas from the generator through said flue, the superheater B, having in its lower part a gas-combustion chamber F, an open-work structure of bricks and metal bars located in said superheater above the gas-combustion chamber, the pipe A' for conveying hot water from the boiler to the superheater, the stoves N N', each provided with an internal open-work structure of heat-absorbing materials, flues for connecting the gas-generator, superheater, and stoves, valves located in said flues for causing the products of combustion escaping from the generator and superheater to pass out through said stoves alternately, and the air-blast for sustaining combustion in the gas-generator and superheater to pass in through said stoves alternately, substantially as described.

4. In an apparatus for making water-gas, the combination of the gas-generator A, the steam generator and superheater B, the stoves N N', the tubular boiler W, the scrubber Z, pipes for supplying the apparatus with atmospheric air, flues for conducting producer-gas from the generator A to the superheater B, a pipe for conveying water or steam from the boiler to the superheater, pipes for conveying water-gas from the generator to the tubular boiler and from the boiler to the scrubber, valves for causing the products of combustion escaping from the gas-generator and from the superheater to pass out through said stoves alternately, and the air-blast for sustaining combustion in the generator and superheater to pass in through said stoves alternately, substantially as described.

In testimony whereof I affix my signature in presence of two witnesses.

THADDEUS S. C. LOWE.

Witnesses:
WALTER C. RODMAN,
RANDAL MORGAN.